United States Patent Office 3,503,903
Patented Mar. 31, 1970

3,503,903
POLYMERS OF IMPROVED PERFORMANCE CAPABILITIES AND PROCESSES THEREFOR
Richard G. Shaw, New Brunswick, Ying L. Yeh, Highland Park, and Joseph W. Lewis, Middlesex, N.J., assignors to Union Carbide Corporation, New York, N.Y., a corporation of New York
No Drawing. Continuation of application Ser. No. 445,256, Apr. 2, 1965. This application Jan. 13, 1969, Ser. No. 793,230
Int. Cl. C08f *13/02*
U.S. Cl. 260—2
9 Claims

ABSTRACT OF THE DISCLOSURE

The performance capabilities of p-xylylene polymers are improved by terminating the reactive residual radicals found in freshly vapor deposited p-xylylene polymers with radicals having a more rapid reactivity with p-xylylene radicals than oxygen for a period of time sufficient to cause the electron spin resonance spectrum of the polymer to disappear.

---

This application is a continuation of Ser. No. 445,256, filed Apr. 2, 1965, now abandoned.

This invention relates to methods for improving the performance capabilities of p-xylylene polymers and to the improved polymers produced thereby.

Polymers of the p-xylylene family represented generally by the repeating unit $\{Y_2C-Ar-CY_2\}$ wherein —Ar— is a divalent benzenoid nucleus and Y is hydrogen, halogen, alkyl, aryl, nitrile, or any other suitable alpha substituent, have heretofore been prepared primarily by deposition from the vapor state of a p-xylylene diradical specie represented generally as $\cdot Y_2C-Ar-CY_2\cdot$ wherein —Ar— and Y are as defined hereinabove.. The polymers thus formed are tough and strong and exhibit an unusual combination of electrical, physical and thermal properties. For example, these polymers resist attack by all common organic solvents up to temperatures of about 300° C.; they exhibit high tensile strengths, i.e., over 10,000 p.s.i. and relatively high elongation to break, e.g., 30–100 percent; and they also provide electrical properties which are substantially constant over wide temperature ranges, e.g., poly-p-xylylene exhibits a dielectric constant of 2.65 and a dissipation factor of 0.0003 which vary only slightly with frequency from 1000 c.p.s. to 10 mcs. and with temperatures from 4° K. to 500° K.

It has been observed, however, that there is a tendency for some of the properties, especially the thermal properties, to deteriorate upon exposure to air over a relatively short period of time. For example, the ability of poly-(2,5-dichloro-p-xylylene) to withstand elevated temperatures markedly decreases over a period of several days upon continued exposure to air.

Accordingly, it is an object of the present invention to provide improved p-xylylene polymers capable of maintaining their excellent combination of electrical, physical and thermal properties despite exposure to the atmosphere for long periods of time. It is another object of the present invention to provide methods for improving the performance capabilities of p-xylylene polymers and their resistance to atmospheric attack.

The present invention provides processes for improving the performance capabilities of p-xylylene polymers which comprises terminating residual radicals in freshly deposited p-xylylene polymers by reacting said radicals with radicals having more rapid reactivity with p-xylylene radicals than oxygen for a sufficient time to cause the electron spin resonance spectrum of said polymer to disappear.

Several methods presently exist for applying p-xylylene polymers to substrate surfaces. These polymers can be prepared by the pyrolysis of 1,4-dimethylarylenes such as p-xylene at very high temperature, e.g., 800°–1000° C. (M. Swarc, Nature, 160, 403 (1947); Faraday Society Discussions 2, 46 (1947); J. Chem. Phys. 16, 128 (1948); and particularly J. Pol. Sci. 6, 319 (1951). Polymers of this type have also been prepared from p-xylylene dihalides (Jacobson, J. Am. Chem. Soc. 54, 1513 (1932); C. J. Brown and A. C. Farthing, Nature,164, 915 (1949)). Similar polymers have also been prepared by pyrolysis of p-methylbenzyl quaternary ammonium hydroxides as described by F. S. Fawcett in U.S. Patent 2,757,146. T. E. Young in U.S. Patent 2,999,820 describes still another method of obtaining p-xylylene polymers. This method proceeds through the decomposition of quaternary ammonium compounds such as trimethyl (p-methylbenzyl)-ammonium hydroxide by heating such compounds in aqueous alkali metal hydroxide solutions to temperatures of at least about 100° C.

While the p-xylylene polymers formed by many of the above methods, especially the pyrolytic methods, are significantly cross-linked and highly crystalline in nature, recent developments have enabled the obtainment of truly linear p-xylylene polymers free of cross-linking in commercial yields and efficiencies. In particular, W. F. Gorham in Canadian Patents 637,507 and 638,335 describes the preparation of unsubstituted and ring-substituted p-xylylene polymers and copolymers by the pyrolysis of a cyclic di-p-xylylene having the general structure

(II)

wherein Ar— represents a divalent benzenoid nucleus as defined hereinbelow. Pyrolysis occurs at temperatures between about 450° C. and 700° C. at pressures within the range of 0.001 to 10 mm. Hg.

Inasmuch as the coupling and polymerization of the reactive diradicals formed by the method hereinabove decribed does not involve the aromatic ring but only the free radical sites on the methylene carbon atoms, any unsubstituted or substituted p-xylylene polymer can be prepared since the nuclear substituent groups function essentially as inert groups. Thus, the divalent benzenoid nucleus, —Ar—, can be any benzene ring substituted with any monovalent inorganic or organic groups which can normally be substituted onto an aromatic nucleus or the unsubstituted benzene ring, itself.

Notable among the inert substituents that have been substituted on the aromatic nuclei of such p-xylylene polymers other than hydrogen, are the halogens including chlorine, bromine, iodine and fluorine, alkyl groups such as methyl, ethyl, propyl, n-butyl, sec.-butyl, tert.-butyl, amyl and hexyl, cyano, phenyl, hydroxy, alkoxy, acetoxy, amino, nitro, carboxy, benzyl and other similar groups. While some of the above groups are potentially reactive under certain conditions or with certain reactive materials, they are unreactive under the conditions encountered in the present invention and thus are truly inert.

It has been found in the present invention that freshly deposited p-xylylene polymers contain a large amount of residual reactive free radicals which quite unexpectedly have unusually long half lives. Thus, when p-xylylene polymers are allowed to stand in the atmosphere, as is normally done, these radicals react with the oxygen in the atmosphere to form peroxides resulting in deterioration of many of the polymer properties; for example, it has been found that combined oxygen has an adverse effect on some of the electrical properties particularly insulation resistance and dissipation factor and also a marked effect on the thermal properties.

Each p-xylylene radical species has its own characteristic apparent half life. For example, p-xylylene radicals have an apparent half life of about 20 minutes at 25° C. whereas di-chloro-p-xylylene radicals:

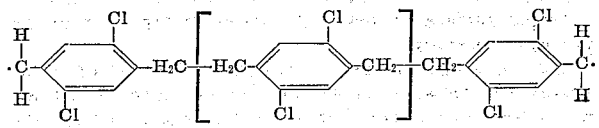

have an apparent half life of about twenty-one hours at 25° C. The term "apparent half-life" as used herein is intended to define the time it takes the signal emitted by an electron spin resonance spectrometer examining a sample of p-xylylene polymer to fall to one half of its initial value.

The unusually long half lives of these reactive radical species are believed to account for the marked decrease in the thermal stability of p-xylylene polymers over a period of several days after deposition. This period was found to approximate the maximum length of time over which an electron spin resonance signal was observed on a spectrometer examining a sample of p-xylylene polymer under ambient conditions.

In order to rapidly terminate the reactive nature of the residual radicals in the freshly vapor deposited p-xylylene polymer, it has been found in accordance with the present invention that reacting the residual radicals with radicals having more rapid reactivity with p-xylylene radicals than oxygen for a sufficient period of time to cause the electron spin resonance spectrum of said polymer to disappear will effectively terminate the residual radical activity and thereby provide p-xylylene polymers of significantly improved performance capabilities.

As used herein and in the appended claims, the phrase "radicals having more rapid reactivity with p-xylylene radicals" is intended to define radicals other than p-xylylene radicals which react with p-xylylene radicals more rapidly than oxygen reacts with said p-xylylene radicals and confer improved performance capabilities, e.g., thermal stability, upon the thus terminated polymer. Also, the above phrase is inclusive of p-xylylene radicals themselves, which, when heated to temperatures above the glass transition temperature but below the melting point of said polymer, have been unexpectedly found to exhibit more rapid reactivity inter se than with oxygen. Thus, it has now been found that the residual radical concentration in p-xylylene polymers can be auto-terminated by heating in the manner described above.

The requisite time period for substantially complete termination can be readily ascertained with the aid of an electron spin resonance spectrometer employed with conventional methods known in the analytical arts. It is, of course, recognized that the requisite time period varies inversely with the temperature, i.e., at higher temperatures, the requisite period for effective heat termination of radical activity is shortened. For example, when poly-p-xylylene is heat terminated at 250° C., the electron spin resonance spectrum disappears in about one to two minutes; whereas, when heat termination is conducted at 150° C., the spectrum disappears in about ten minutes.

All electron spin resonance spectra herein were obtained on a Varian V-4500 spectrophotometer operating at about 9,000 megacycles using 100 kc. modulation with 15 decibels attenuation and a six-inch magnet. Specimens of freshly deposited polymer can be cut and placed in appropriate sample tubes. The polymers can either be heat terminated directly in the sample tube while under observation or dissimilar radicals can be generated in situ in the sample tube. Empolying either procedure the polymer can be terminated while under observation in the spectrophotometer. The sensitivity limit of the spectrophotometer is $10^{12}\Delta H$ electron spins wherein $\Delta H$ is equivalent to the signal width in units of gauss at half maximum absorption. Accordingly, the electron spin resonance spectrum of the polymer "disappears" when the concentration of residual radicals has dropped below about $10^{12}\Delta H$ electron spins. At this lower concentration, any remaining radicals have been found to exert substantially no adverse effects on polymer properties.

The heat termination of the freshly vapor deposited p-xylylene polymer is preferably conducted under vacuum conditions, i.e., from about 0.001 to 10 mm. Hg. Most conveniently, the deposition chamber containing the substrates to be coated can be encompassed by suitable heating means, e.g., heating tape, and upon completion of the deposition of the polymer, the heating means can be activated thereby heating the coated substrates while still under vacuum. It has been found, however that, as the degree of substitution on the benzenoid nucleus of the p-xylylene polymer increases, heat termination can be conducted in the atmosphere. For example, when poly-p-xylylene is heat terminated in the atmosphere, it is accompanied by substantial oxidation and the improvement in properties is not obtained. Nuclear halogenated p-xylylene polymers, e.g., poly(2,5-dichloro-p-xylylene) however, can be heat terminated either in vacuum or in air without adverse effects.

The freshly vapor deposited p-xylylene polymer can also be terminated by generating radicals other than p-xylylene radicals in situ and inducing them to react with the residual p-xylylene radical concentration. Any suitable radical generation process can be employed, e.g., electrolytic, photolytic, electrostatic, thermal, chemical and the like; provided however, that the resulting terminated polymer is more thermally stable than the atmospherically or oxygen terminated polymer. For example, nitrogen dioxide reacts with p-xylylene radicals at a considerably faster rate than does oxygen; however, since termination in this instance is by nitro groups, there is no increase in thermal stability. Alkyl radicals, preferably those containing from 1 to about 4 carbon atoms, such as methyl, ethyl, propyl, isopropyl, b-butyl, sec-butyl and tert.-butyl have been found to be most effective as terminating radicals in the present invention. For example, irradiation of methyl iodide with ultraviolet generates methyl radicals which rapidly react with p-xylylene radicals to produce a terminated polymer of improved properties. Iodine vapor under similar circumstances did not terminate the polymer. Termination with methyl radicals as demonstrated by a disappearance of the electron spin resonance spectrum of the polymer can be accomplished within about five to ten minutes, whereas atmospheric or oxygen termination under similar conditions requires about 6 days and is accompanied by a deterioration in polymer properties as hereinabove described. Termination can also be accomplished by passing the freshly deposited p-xylylene polymer through a heated bath containing an alkyl peroxide in solution, for example, a 0.5–2 percent solution of tert.-butyl peroxide in benzene maintained at about 60° C. In this manner, termination of the residual radical concentration in poly(2,5-dichloro-p-xylylene) was accomplished in about 5 minutes as determined by electron spin resonance measurements. While the primary cleavage of tert.-butyl peroxide is to tert.-butoxy radicals, an electron shift within the radical results in the formation of acetone and a methyl radical. It is believed that, in this instance, the methyl radical is the terminating radical.

It has also been found in this invention that the precursor material employed in the radical generation process must undergo dissociation within the film in order to effectively terminate the film as opposed to a gas phase dissociation coupled with diffusion of the resulting radical into the film. In the latter instance, termination of the radicals in the film was not obtained. Thus, it is considered preferable that the precursor material employed in the radical generation process completely saturate the film to be terminated.

The improvement in the thermal stability of the p-xylylene polymers obtained by the heat or chemical termination processes of the present invention is surprisingly significant. For example, poly(2,5-dichloro-p-xylylene) as heretofore prepared becomes embrittled upon exposure in air for three to five hours at 175° C. whereas the identical polymer having undergone the heat termination process of the present invention does not become embrittled even after being subjected to 175° C. for over two weeks under identical conditions.

The hours to embrittlement of the polymer is determined by placing a strip of the polymeric film in an oven maintained at a given temperature, e.g., 175° C. and then folding the strip upon itself at regular periodic intervals. The time in hours at which one such folding leads to a break in the film is denoted the hours to embrittlement of the polymer at that temperature.

The p-xylylene polymers when terminated either chemically or thermally in accordance with the present invention have been found to contain essentially no combined oxygen. Oxygen activation analysis involving irradiation of a film sample in a pile and subsequent scintillometer detection of the presence of the oxygen isotope $O^{15}$ has established that all of the samples of p-xylylene polymer which have been terminated in accordance with the present invention contain no detectable oxygen; whereas, the oxygen or atmospherically terminated polymer samples show from about 1000 to about 4000 parts per million oxygen.

Thus, through the present invention p-xylylene polymers of improved performance capabilities and containing essentially no oxygen are provided. These improved p-xylylene polymers are especially useful as dielectrics and insulation in electronic applications such as the manufacture of capacitors, resistors, transistors and the like wherein constant electrical properties over wide temperature ranges and high thermal stability are required.

The following examples further illustrate the present invention but are in no way intended to limit the scope thereof.

EXAMPLE I 6 grams of the cyclic dimer, tetrachloro-di-p-xylylene, having the structural formula

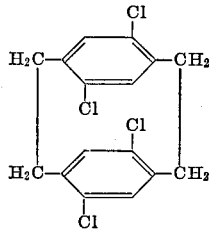

and produced in the manner described in German Patent 1,085,673 was placed within a boro-silicate glass sublimation chamber 2 inches in diameter and 4 inches long. One end of said chamber was sealed whereas the other end was connected by a standard taper joint to a 1⅜ inch diameter quartz pyrolysis tube 26 inches long. The cyclic dimer was sublimed at an outside temperature of about 170° C. and a pressure of about 0.2 mm. Hg. The vapors passed through a 6-inch section of the pyrolysis tube (vaporization zone) heated to 200° C. and then through a 19 inch length (pyrolysis zone) maintained at about 680° C. The pressure rose during pyrolysis from 0.008 mm. Hg to 0.15 mm. Hg and subsequently dropped to 40 microns indicating that all the dimer had undergone pyrolysis. Connected to the terminal portion of the pyrolysis tube via a 6-inch long flanged dome was a Pyrex deposition chamber 4 inches in diameter and 20 inches long. The deposition chamber was first wrapped in aluminum foil and then wrapped with heating tape. Excess vapors were condensed in a Dry Ice-acetone trap.

The cyclic dimer was sublimed and pyrolyzed to form dichloro-p-xylylene diradicals having the structural formula

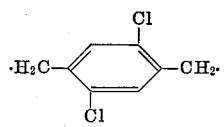

which condensed and polymerized in the deposition chamber which was maintained at room temperature to form a coating of poly(2,5-dichloro-p-xylylene) on the walls of the chamber. After deposition was complete, the heating tape surrounding the deposition chamber was activated and a temperature of 170° C. was attained as rapidly as possible and sustained for 5 minutes. During this period, the pressure in the deposition chamber was 40 microns. Thereafter, the chamber was opened and the polymer removed. Employing the test defined hereinabove for determining the hours to embrittlement of the polymer, the heat terminated polymer was found to withstand a temperature of 175° C. for in excess of 336 hours at which time the test was discontinued although the sample was still unaffected. In comparison, however, a control sample produced in the manner described above but without the heat termination became brittle at 175° C. within three hours.

EXAMPLE II

Employing the method described in Example I, a film of poly(2,5-dichloro-p-xylylene) was deposited on the walls of the deposition chamber. The film was removed and cut in half, one half was placed in an oven at 175° C. in atmosphere for 5 minutes and then removed. Under these conditions, the heat terminated polymer was found not to undergo embrittlement even after being subjected to a temperature of 175° C. for over two weeks compared to embrittlement within 3 hours for the control sample, i.e., the other half of the same material, which was untreated.

EXAMPLE III

Employing the method described in Example I, a film of poly-p-xylylene was deposited on the walls of the deposition chamber. After deposition was complete, the heating tape surrounding the deposition chamber was activated and a temperature of 150° C. was maintained for 15 minutes. During this period, the pressure in the chamber was about 60 microns. Thereafter the chamber was opened and the polymer removed.

Table I below demonstrates the improvement in performance capabilities obtained by the heat termination process of the present invention. The comparison is made with a sample of poly-p-xylylene prepared in the same manner described above but without the additional heat termination process.

TABLE I

| | Control | Heat terminated |
|---|---|---|
| Hours to embrittle at 150° C | 1.5 | 3.5 |
| Insulation resistance, ohm farads: | | |
| 23° C | $8 \times 10^3$ | $3 \times 10^4$ |
| 125° C | $8 \times 10^2$ | $4.7 \times 10^3$ |
| Dissipation factor, 23° C., 60 c.p.s | 0.0003 | 0.0001 |

EXAMPLE IV

Employing the method described in Example I, a film of poly(2,5-dichloro-p-xylylene) was deposited on the walls of the deposition chamber. The film was removed and film specimens were placed in a Pyrex test tube capped with a syringe stopper. Air was displaced with argon and methyl iodide was introduced in a manner such that the liquid level remained below the film with no direct contact between the film and the liquid at any point. The tube was then irradiated with a 140-watt high-pressure mercury arc lamp for about ten minutes at which time the electron spin resonance spectrum of the polymer had disappeared. It was readily apparent that the methyl iodide had saturated the film and had dissociated therein from the traces of elemental iodine found in the film. The iodine could be easily removed by sublimation. Control experiments with iodine vapors led to no significant radical decay. Thermal tests of the chemically terminated polymer established that it was able to withstand continued exposure to a temperature of 175° C. for in excess of 216 hours without becoming embrittled; whereas, a control sample produced in the identical manner but atmospherically terminated became brittle at 175° C. within three hours.

EXAMPLES V-VI

Employing the same procedure described in Example IV with the exception that in the present examples, the freshly deposited film samples were immersed in n-butyl iodide and, as another example, in isopropyl bromide and then subjected to irradiation for 10 minutes at which time the electron spin resonance spectrum of the polymer disappeared. Thermal tests of the resulting chemically terminated film showed at least two orders of magnitude improvement in useful film life at elevated temperatures as compared to control samples which were atmospherically terminated.

EXAMPLE VII

Employing the procedure described in Examples V-VI, a film of poly(2,5-dichloro-p-xylylene) was removed from the deposition chamber and placed in a 1% solution of tert.-butyl peroxide in benzene maintained at 60° C. Deoxygenated benzene was employed and argon was continually bubbled through the solution. Under these conditions, the electron spin resonance spectrum of the polymer disappeared within 5 minutes. Control experiments using benzene alone resulted in no significant decrease of radical activity. Oxygen activation analysis was conducted on both the chemically terminated polymer and the atmospherically terminated control sample. No detectable oxygen was found in the chemically terminated sample whereas 3500 parts per million oxygen was detected in the atmospherically terminated sample. Employing the test for determining the hours to embrittlement of the polymer defined above, the chemically terminated polymer was found to withstand a temperature of 175° C. for in excess of 72 hours. In comparison, however, a control sample produced in the identical manner but atmospherically terminated, i.e., with oxygen became brittle at 175° C. within 3 hours.

What is claimed is:

1. Process for improving the performance capabilities of p-xylylene polymers which comprises heating freshly deposited p-xylylene polymers at temperatures above the glass transition temperature but below the melting point of said polymer for a sufficient period of time to cause the electron spin resonance spectrum of said polymer to disappear.

2. Process for improving the performance capabilities of p-xylylene polymers which comprises heating freshly deposited p-xylylene polymers under vacuum at temperatures above the glass transition temperature but below the melting point of said polymer for a sufficient period of time to cause the electron spin resonance spectrum of said polymer to disappear.

3. Process as defined in claim 2 wherein the freshly deposited polymer is heated to a temperature between about 60° C. and 300° C.

4. Process for improving the performance capabilities of nuclear substituted p-xylylene polymers which comprises heating freshly deposited p-xylylene polymers in air at temperatures above the glass transition temperature but below the melting point of said polymer for a sufficient period of time to cause the electron spin resonance spectrum of said polymer to disappear.

5. Process as defined in claim 4 wherein the freshly deposited polymer is heated to a temperature between about 60° C. and 300° C.

6. Process for improving the performance capabilities of p-xylylene polymers which comprises condensing and polymerizing a p-xylylene diradical having the general formula

wherein Ar is a divalent benzenoid nucleus and Y is a member selected from the group consisting of hydrogen, halogen, alkyl, aryl and nitrile, to form a p-xylylene polymer having the general repeating unit:

wherein Ar and Y are as defined above; heating the freshly deposited p-xylylene polymer at temperatures above the glass transition temperature but below the melting point of said polymer for a sufficient period of time to cause the electron spin resonance spectrum of said polymer to disappear.

7. Process as defined in claim 6 wherein the freshly deposited polymer is heated to a temperature between about 60° C. and 300° C. at subatmospheric pressures.

8. Process as defined in claim 7 wherein the pressure is between about 0.0001 mm. Hg and about 10 mm. Hg.

9. Process as defined in claim 6 wherein a freshly deposited nuclear substituted polymer is heated in air to a temperature between about 60° C. and 300° C.

References Cited

UNITED STATES PATENTS 3,349,045   10/1967   Gilch _____ 260—2

SAMUEL H. BLECH, Primary Examiner

U.S. Cl. X.R.

117—106, 161; 204—159.18